May 6, 1969     F. D. SKELLEY     3,442,392

FILTER CARTRIDGE AND METHOD OF MAKING SAME

Filed Oct. 7, 1966

INVENTOR.
FRANCIS D. SKELLEY

BY
McGlew & Toren
ATTORNEYS.

United States Patent Office 3,442,392
Patented May 6, 1969

3,442,392
FILTER CARTRIDGE AND METHOD OF MAKING SAME
Francis D. Skelley, 72 67th St.,
West New York, N.J. 07093
Filed Oct. 7, 1966, Ser. No. 585,026
Int. Cl. B01d 27/00
U.S. Cl. 210—491                                  8 Claims

ABSTRACT OF THE DISCLOSURE

A filter construction includes a tube of a fibrous material such as fiber glass having an interior surface with at least one groove therein bounded by a groove surface which forms a narrowing throat opening at the interior surface of the tube. The groove surfaces are advantageously formed in a curve and they have an interior dimension larger than the size of the throat opening. The grooves provide a greatly increased area for filtering action.

The filter cartridge is formed with the fiber glass material by heating a surface of the material to cause the fibers to become somewhat brittle and then cutting grooves across the surface while the material is arranged flat. Thereafter, the bat is formed into a tubular shape and the grooves oriented inwardly to cause a slight closing of the opening into the grooves.

---

This invention relates, in general, to the construction of filter cartridges, and to a method of making such cartridges, and in particular to a new and useful filter cartridge made of a fiber glass or similar material which is bonded together in layers and includes an inner formation or wall surface which is formed with a plurality of cavities which aid in the filter action, and to a method of making such filters.

The present invention is an improvement over the prior art devices, inasmuch as it provides an inexpensive filter having preferably an inner core which is formed with a plurality of passages or filtering areas defined in the inner surface thereof for facilitating the filtering action and to an improved method of making such filters. Prior to the present invention, it has been known to form filters of a fiber glass material and to mold the fiber glass into a filter cartridge tube by applying, for example, successive layers over a mandrel which are bonded together.

It has also been known to cut grooves into the interior surface of such filters in order to improve the filtering action thereof. In order to construct the filters in this manner, however, it was heretofore necessary to first form the filter into a tubular shape and thereafter effect the cutting of the groove. A disadvantage in such method is that it is very expensive to effect, and in addition, the grooves which are formed after the tubular shape is set must have a maximum dimension at the inner surface of the tube so that such grooves do not materially increase the internal filtering area of a filtering tube or cartridge.

In accordance with the present invention there is provided an improved method of forming filter cartridges of fiber glass material having fibers which are advantageously generally oriented in a particular direction, for example, cross direction or at an angle to each other. In accordance with the method of the invention, individual layers of fiber glass are first formed into straight bats or blankets and individual uniform grooves are formed in a surface thereof. To facilitate the groove formation, the surface to be grooved is subjected to heating sufficient to cause the surface area to become sufficiently brittle for easy cutting of the grooves. The structure of the remainder of the bat or bat laminates is not heated to cause brittleness of the fibers in order to insure that the fibers will not fracture or bend but will move when the bat or bat layers are formed on a mandrel into a tubular shape.

The bats with the formed grooves are thereafter rolled over a mandrel into a cylindrical shape in a manner preferably such that the interior layer includes grooves which are formed with narrowing throats due to the curved bending of the inner surface thereof. By cutting the grooves before the fiber glass bats are rolled into a tubular configuration, the configuration of grooves after bending into a cylindrical form are widened at their interiors but formed with relatively small-sized access openings at the inner surface of the filtering element. This permits a greater number of grooves to be formed and the grooves define relatively large-sized cavities which are advantageously formed to extend over the complete longitudinal interior surface of the filtering elements and provide a greatly increased area for filtering action.

In accordance with another aspect of the invention, the completed filter cartridges are formed by adding successive bat layers of fiber glass over the first formed layer and in some instances by adhering each layer to the next previous layer such as by a phenolic resin or other suitable binder. It is also possible to form interior layers of the fiber glass material with grooves which may be oriented either toward the central portion of the filter or toward the exterior circumference in order to achieve desired filtering actions. Grooves which are located in an intermediate layer will provide areas within the filter for trapping of solid residues in addition to the areas on the interior surface of the filter itself which forms a barrier against the inflow of the impurities.

Fiber glass filter have been found to be particularly applicable for filtering fluids such as a water-liquid fuel emulsion and facilitate the removing of liquid and solid contaminants from liquid fuels. The filter of the present invention, because of its increased filtering area at the interior layer at the location of the inflow of the fuel, is very satisfactory for such installations.

Accordingly, it is an object of the invention to provide an improved method of forming a liquid filter which includes forming the filter in flat layers of glass fiber bats and forming at least the inner layer by first cutting a plurality of grooves across the surface of the bat, then forming the layer around a mandrel into a tube with the grooves oriented inwardly to form an interior filtering surface with increased filtering areas formed by the grooves, and thereafter applying successive bat layers, tape or screening around the first layer.

A further object of the invention is to provide a filtering device which includes at least one layer comprising a fiber glass bat having a plurality of grooves which are formed with outer entrance openings which are smaller than the interior formations of the grooves.

A further object of the invention is to provide a filtering device which includes a plurality of layers of fiber glass material which are formed into a tube, with at least some of the layers having grooves defined on one of the abutting surfaces forming increased areas for filtering action.

A further object of the invention is to provide a method of forming a cylindrical filter cartridge comprising forming a fiber glass mat, subjecting the mat to heat sufficient to cause one surface to become brittle which the remainder does not, cutting grooves in the brittle surface of said mat, forming the mat into a cylindrical configuration with the grooves oriented interiorly, and adding at least one additional layer of a fiberglass mat.

A further object of the invention is to provide a filter cartridge which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
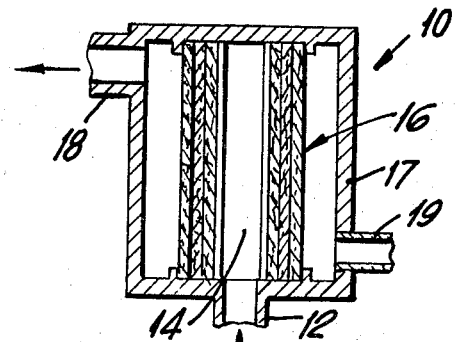
FIG. 1 is a transverse sectional view of a filter constructed in accordance with the invention.

Referring to the drawings in particular, the invention finds particular application for use with a liquid filtering device generally designated 10, as indicated in FIG. 1. A liquid such as a fuel which is contaminated with impurities and water, for example, enters through the inlet 12 and flows through a central core 14 of a filter cartridge generally designated 16. During the flow of the fuel from the interior core 14 outwardly through the cartridge 16, the impurities are trapped by the layers of the cartridge and the filtered liquid exits through an exit or discharge 18. Liquid such as water can be withdrawn from fuel by tapping and removing the liquid at 19. Flow may, of course, be from the exterior of the cartridge 16 to the interior, if so desired. The fiber glass of the filter 16 produces a coalescing action on any droplets of water which may be entrained in the fuel. The water will tend to accumulate in the lower portion of the filter housing 17 and may be removed through a discharge 19.

Figure 2:
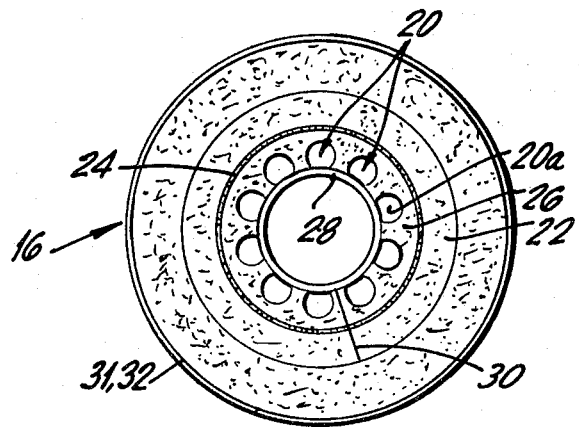
FIG. 2 is an end elevational view of a filter cartridge constructed in accordance with the invention.
Figure 3:
FIG. 3 is an end elevational view of a fiber glass mat forming an interior filtering layer of the filter constructed in accordance with the invention.

In accordance with the invention, the filter 14 is advantageously made of one or more layers formed together into a tube or cylinder as indicated in FIG. 2. A feature of the filter of the invention is that the interior surface 14 has a plurality of grooves 20 defined therein. The grooves 20 are of particular configuration and include internal portion 20a which are wider than the openings of the grooves at the surface 26a. With grooves of this configuration, there is provided a vastly increased area of surface which is available at the interior or core 14 for filtering action.

A further feature of the invention is the method of making the filter cartridge 16. The cartridge 16 is manufactured by first selecting a bat or a layer 22 of a fiber glass material of a selected length which is suitable for forming the selected tubular configuration of filter cartridge 16. An adhesive material 24 is then sprayed over one side thereof and a second bat or layer 26 is arranged over the adhesive material so as to bond it to the first layer 22. The combined formation is then placed into a suitable mechanism to compress the materials and to subject the fiber glass bats to a heating which is advantageously concentrated on the surface 26a of the bat 26 in order to provide a gradual setting of the fibers adjacent this surface. The heat and pressure treatment is such that the fibers in the bat 22 will remain in the original state so that they can be easily manipulated when the bat is formed into a tubular configuration.

The heating of the fibers adjacent the surface 26a facilitates the cutting of the surface which is carried out in order to form the spaced grooves 20 which may be arranged in longitudinal parallel relationship or even in spiral or other arrangements.

The two bats 22 and 26 which become bound together by the heat treatment and the action of the adhesive or binder such as phenolic resin 24 are then formed around a mandrel 28 into a tubular configuration and the abutting ends are sealed such as by a resin binder 30. It should be noted that when the two layers 22 and 26 are formed around the mandrel 28, the interior surface 26a becomes compressed and shortened so that the outlets to the grooves 20a are of a smaller diameter than the maximum diameter of the interior of the grooves. Thus, grooves 20a are formed with a large interior filter surface area.

It should be appreciated that the inner two layers may be composed of a single layer instead of the two layers 22 and 26. In such an instance, the combined layer would be heat treated so that the inner surface 26a is provided with a brittle structure as before and the outer surface of the combined layer is not heat treated to the extent to prevent the free expansion of the fibers.

Figure 4:
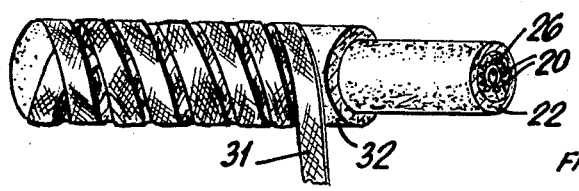
FIG. 4 is a perspective view, partly broken away, of another embodiment of the cartridge.

While the two layers 22 and 26 are on the mandrel 28, additional wraps or layers of fiber material are wound therearound advantageously in a circular or spiral manner. Such wraps may advantageously include additional layers of glass cloth or screen 31 and compressed bats 32 which are advantageously wound as indicated in FIG. 4.

After the final wrapping or layer is applied, the ends of the tubular cartridge formation are clamped together with the mandrel 28 remaining in place and the entire assembly is put in an oven to provide for the controlled setting of the fibers to achieve the desired binding and density of the finished tubular structures.

Because grooves cannot easily be cut in uncured fiber glass, the invention provides for the pre-treating of the fiber glass bats so that one side thereof becomes brittle enough to permit easy cutting of the fiber glass by a multiple number of cutters (not shown). The density of the individual layers and the overall structure may be controlled somewhat by the amount of compression of the fibers and to some extent by the curing thereof.

In the method of the invention it is usually desirable to use an uncured binder such as a phenolic resin between each layer of fiber glass material. In the assembled form of the layers, the fibers of each additional layer may be advantageously arranged to cross. In some instances it is preferable to form the innermost core with the fibers generally perpendicular to one another and in the assembled form which is arranged so that they will extend along paths substantially parallel to the direction of fluid flow through the filter cartridge.

The uncured fiber glass material of two adjacent layers are connected together with a binder of a material such as phenolic resin, and the two are cured together by being exposed to an elevated temperature. The curing process causes the thermosetting resin binder material to become hardened and to firmly hold the layers together.

While specific embodiments of the invention have been shown and described in detail to illustrate the application of the inventive principles, it will be understood that the invention may be embodied otherwise without departing from such principles.

What is claimed is:

1. A filter cartridge comprising a tube of fiber glass material having a plurality of layers with at least an inner layer having an interior surface with a plurality of grooves defined therein each having an inner groove surface extending a curve with a narrowing throat formed thereby.

2. A filter cartridge according to claim 1, wherein said cartridge is formed of a plurality of fiber glass layers which are bound together by a resin.

3. A filter cartridge according to claim 2, including a reinforcing layer of a screen material wrapped around said layers.

4. A filter cartridge comprising a solid walled tube of fibrous material having pores for the passage of liquid therethrough, said tube having an interior surface with at least one groove defined therein having an inner groove surface forming a wide groove interior cavity and a narrowing throat at the opening to the groove cavity at the interior surface of said tube.

5. A method of forming a filter cartridge using fiber glass material, comprising forming a flat fiber glass bat of material and heating the material so that at one surface the fibers become somewhat brittle and the other surface is relatively unaffected, cutting grooves across the surface which has brittle fibers while it is arranged flat, thereafter forming the bat into a tubular shape with the grooves oriented inwardly to cause a shortening of the interior surface of the bat and the slight closing of the opening of the grooves, and binding the bat together into a cylindrical form.

6. A method according to claim 5, including subjecting the tubular form to heat to cause the setting of the resin binder and the hardening of the fiber glass material.

7. A method according to claim 5, including applying a wrap of additional layers of fiber glass screening over the tubular form and thereafter heat-setting the finished tubular form.

8. A method according to claim 7, including adding additional compressed fiber glass bats and fiber glass screening in the form of wraps around the tubular form.

References Cited

UNITED STATES PATENTS

| | | | |
|---|---|---|---|
| 2,970,345 | 2/1961 | Wangner | 264—139 X |
| 3,061,107 | 10/1962 | Taylor | 210—496 X |
| 3,063,888 | 11/1962 | Howard et al. | 156—187 |
| 3,347,391 | 10/1967 | Steensen | 210—491 |
| 3,352,423 | 11/1967 | Osterman | 210—496 |
| 3,360,420 | 12/1967 | Paul et al. | 156—257 X |
| 3,376,979 | 4/1968 | Bair | 210—490 X |

REUBEN FRIEDMAN, *Primary Examiner.*

JOHN ADEE, *Assistant Examiner.*

U.S. Cl. X.R.

210—496; 156—187, 257